United States Patent
Jha et al.

(10) Patent No.: US 9,439,084 B2
(45) Date of Patent: Sep. 6, 2016

(54) TECHNIQUES AND CONFIGURATIONS ASSOCIATED WITH OPERATION OF AN EVOLVED NODE B AT MULTIPLE COVERAGE ENHANCEMENT LEVELS

(71) Applicant: Intel Corporation, Santa Clara, CA (US)

(72) Inventors: Satish C. Jha, Hillsboro, OR (US); Maruti Gupta, Portland, OR (US); Mohammad Mamunur Rashid, Hillsboro, OR (US); Rath Vannithamby, Portland, OR (US); Ali Taha Koc, Portland, OR (US); Kathiravetpillai Sivanesan, Richardson, TX (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 14/563,923

(22) Filed: Dec. 8, 2014

(65) Prior Publication Data

US 2015/0271686 A1 Sep. 24, 2015

Related U.S. Application Data

(60) Provisional application No. 61/969,784, filed on Mar. 24, 2014.

(51) Int. Cl.
*H04W 24/02* (2009.01)
*H04W 84/22* (2009.01)
*H04W 88/08* (2009.01)

(52) U.S. Cl.
CPC ............ *H04W 24/02* (2013.01); *H04W 88/08* (2013.01)

(58) Field of Classification Search
None
See application file for complete search history.

(56) References Cited

U.S. PATENT DOCUMENTS

| 8,687,545 | B2 | 4/2014 | Damnjanovic et al. |
| 2013/0022016 | A1 | 1/2013 | Wei |
| 2014/0098761 | A1* | 4/2014 | Lee ................... H04W 74/006 370/329 |
| 2015/0031377 | A1* | 1/2015 | Charbit ................ H04W 48/08 455/450 |
| 2015/0043420 | A1* | 2/2015 | Xiong ............... H04B 7/15507 370/315 |

(Continued)

FOREIGN PATENT DOCUMENTS

WO WO 2014/043034 A2 3/2014

OTHER PUBLICATIONS

Jha, "Adaptive DRX Configuration to Optimize Device Power Saving and Latency of Mobile Applications over LTE Advanced Network", Jun. 9-13, 2013, 2013 IEEE International Conference on Communications (ICC), all pages.*

(Continued)

*Primary Examiner* — Candal Elpenord
*Assistant Examiner* — Adam Duda
(74) *Attorney, Agent, or Firm* — Schwabe, Williamson & Wyatt, P.C.

(57) ABSTRACT

Embodiments of the present disclosure describe systems and methods for operation of an evolved node B to provide multiple coverage enhancement levels. Various embodiments may include an operational mode configured to provide a first coverage enhancement level associated with user equipments (UEs) that have established communication with the eNB. These embodiments may also include a discovery mode configured to operate at a second coverage enhancement level to discover UEs configured for a higher coverage enhancement level. Other embodiments may be described and/or claimed.

25 Claims, 5 Drawing Sheets

(56) References Cited

U.S. PATENT DOCUMENTS

| | | | | |
|---|---|---|---|---|
| 2015/0043445 A1* | 2/2015 | Xiong | ................... | H04W 16/26 370/329 |
| 2015/0117233 A1* | 4/2015 | Wong | ................... | H04W 4/005 370/252 |
| 2015/0181440 A1* | 6/2015 | Chen | ................... | H04W 16/18 370/329 |
| 2015/0181533 A1* | 6/2015 | Chen | ................... | H04W 52/146 455/522 |
| 2015/0181576 A1* | 6/2015 | Papasakellariou | ........ | H04L 1/00 370/329 |
| 2015/0208415 A1* | 7/2015 | Xu | ......................... | H04L 5/001 370/329 |

OTHER PUBLICATIONS

Jha, "Device Power Saving Mechanisms for Low Cost MTC Over LTE Networks", Jun. 10-14, 2014, 2014 IEEE International Conference on Communications Workshops (ICC), all pages.*

Jha, "Power Saving Mechanisms for M2M Communication over LTE Networks", Jul. 3-5, 2013, 2013 First International BLack Sea Conference on Communications and Networking (BlackSeaCom), all pages.*

3GPP, "Study on provision of low-cost Machine-Type Communications (MTC) User Equipments (UEs) based on LTE (Release 12)," 3GPP TR 36.888 V12.0.0 (Jun. 2013), Jun. 26, 2013, Lte Advanced, 55 pages.

3GPP, "Evolved Universal Terrestrial Radio Access (E-UTRA); Medium Access Control (MAC) protocol specification (Release 12)," 3GPP TS 36.321 V12.1.0 (Mar. 2014), Mar. 20, 2014, Lte Advanced, 57 pages.

3GPP, "Evolved Universal Terrestrial Radio Access (E-UTRA); Radio Resource Control (RRC); Protocol specification (Release 12)," 3GPP TS 36.331 V12.1.0 (Mar. 2014), Mar. 19, 2014, Lte Advanced, 90 pages.

3GPP, "Evolved Universal Terrestrial Radio Access (E-UTRA); User Equipment (UE) procedures in idle mode (Release 12)," 3GPP TS 36.304 V12.0.0 (Mar. 2014), Mar. 19, 2014, Lte Advanced, 34 pages.

International Search Report and Written Opinion mailed May 7, 2015 from International Application No. PCT/US2015/013320.

* cited by examiner

300

302 ASN1START
```
ECM-CE-Level-Info ::=            SEQUENCE {
    ecm-ce-level                 ECM-CE-Level,
}
```
-- ASN1STOP

```
-- ASN1START

UEAssistanceInformation-r11 ::=           SEQUENCE {
    criticalExtensions                    CHOICE {
        c1                                CHOICE {
            ueAssistanceInformation-r11   UEAssistanceInformation-r11-IEs,
            spare3 NULL, spare2 NULL, spare1 NULL
        },
        criticalExtensionsFuture          SEQUENCE {}
    }
}

UEAssistanceInformation-r11-IEs ::=       SEQUENCE {
    powerPrefIndication-r11               ENUMERATED {normal, lowPowerConsumption}  OPTIONAL,
    lateNonCriticalExtension              OCTET STRING                              OPTIONAL,
    nonCriticalExtension      402         ECM-CE-Level-Information-rxx-IEs          OPTIONAL  -- Need OP
}

ECM-CE-Level-Information-rxx-IEs ::=      SEQUENCE {
    ecm-Ce-Level-Info                     ECM-CE-Level-Info
    nonCriticalExtension                  SEQUENCE {}                               OPTIONAL
}
-- ASN1STOP
```

Figure 4

```
-- ASN1START                                                        500
UL-DCCH-Message ::= SEQUENCE {
    message                 UL-DCCH-MessageType
}

UL-DCCH-MessageType ::= CHOICE {
    c1                      CHOICE {
        csfbParametersRequestCDMA2000           CSFBParametersRequestCDMA2000,
        measurementReport                       MeasurementReport,
        rrcConnectionReconfigurationComplete    RRCConnectionReconfigurationComplete,
        rrcConnectionReestablishmentComplete    RRCConnectionReestablishmentComplete,
        rrcConnectionSetupComplete              RRCConnectionSetupComplete,
        securityModeComplete                    SecurityModeComplete,
        securityModeFailure                     SecurityModeFailure,
        ueCapabilityInformation                 UECapabilityInformation,
        ulHandoverPreparationTransfer           ULHandoverPreparationTransfer,
        ulInformationTransfer                   ULInformationTransfer,
        counterCheckResponse                    CounterCheckResponse,
        ueInformationResponse-r9                UEInformationResponse-r9,
        proximityIndication-r9                  ProximityIndication-r9,
        rnReconfigurationComplete-r10           RNReconfigurationComplete-r10,
        mbmsCountingResponse-r10                MBMSCountingResponse-r10,
        interFreqRSTDMeasurementIndication-r10  InterFreqRSTDMeasurementIndication-r10
    },
    messageClassExtension   CHOICE {
        c2                      CHOICE {
            ueAssistanceInformation-r11         UEAssistanceInformation-r11,
            inDeviceCoexIndication-r11          InDeviceCoexIndication-r11,
      502  mbmsInterestIndication-r11          MBMSInterestIndication-r11,
            ecmCeLevelIndication-rxx            ECMCeLevelIndication-rxx,
            spare12 NULL, spare11 NULL, spare10 NULL,
            spare9 NULL, spare8 NULL, spare7 NULL,
            spare6 NULL, spare5 NULL, spare4 NULL,
            spare3 NULL, spare2 NULL, spare1 NULL
        },
        messageClassExtensionFuture-r11 SEQUENCE {}
    }
}

-- ASN1STOP

504
-- ASN1START
ECMCeLevelIndication-rxx ::=               SEQUENCE {
    criticalExtensions                     CHOICE {
    c1                                     CHOICE {
        ecmCeLevelIndication-rxx-rxx              ECMCeLevelIndication-rxx-IEs,
        spare3 NULL, spare2 NULL, spare1 NULL
    },
    criticalExtensionsFuture               SEQUENCE {}
    }
}

ECMCeLevelIndication-rxx-IEs ::=           SEQUENCE {
    ecm-Ce-Level-Info                      ECM-CE-Level-Info       OPTIONAL,
    nonCriticalExtension                   SEQUENCE {}             OPTIONAL
}

-- ASN1STOP
```

Figure 5

TECHNIQUES AND CONFIGURATIONS ASSOCIATED WITH OPERATION OF AN EVOLVED NODE B AT MULTIPLE COVERAGE ENHANCEMENT LEVELS

CROSS-REFERENCE TO RELATED APPLICATION

This application claims the benefit of U.S. Provisional Application No. 61/969,784 filed Mar. 24, 2014, entitled "A FEEDBACK-BASED MECHANISM TO OPTIMIZE AIR-INTERFACE RESOURCES FOR UES REQUIRING ENHANCED COVERAGE," the entirety of which is hereby incorporated by reference.

FIELD

Embodiments of the present disclosure generally relate to the field of wireless communication, and more particularly, to operation of an evolved node B (eNB) at multiple coverage enhancement levels.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Machine-Type Communication (MTC) is a promising and emerging technology. Potential MTC based applications include smart metering, healthcare monitoring, remote security surveillance, intelligent transportation systems, etc. These services and applications stimulate the design and development of a new type of MTC device that may need to be integrated into current and next generation mobile broadband networks such as LTE and LTE-Advanced.

The existing mobile broadband networks were designed to optimize performance mainly for human type of communications and thus are not optimized for MTC specific requirements. For instance, some MTC devices may be installed in basements of residential buildings. These devices may experience significantly greater penetration losses on the radio interface than normal LTE devices. In order to provide sufficient coverage of such MTC devices, special coverage enhancement considerations may be needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates an example uplink (UL) information element (IE) that may be sent by a coverage constrained UE to indicate a coverage enhancement level the coverage constrained UE is configured for during the discovery mode described herein.

FIG. 4 illustrates an example IE incorporated in an existing radio resource control (RRC) message to indicate a coverage enhancement level of a coverage constrained UE during the discovery mode described herein.

FIG. 5 illustrates an example showing a new RRC message that may carry an IE that may be sent by a coverage constrained UE to indicate a coverage enhancement level the coverage constrained UE is configured for during the discovery mode described herein.

DETAILED DESCRIPTION

Figure 1:
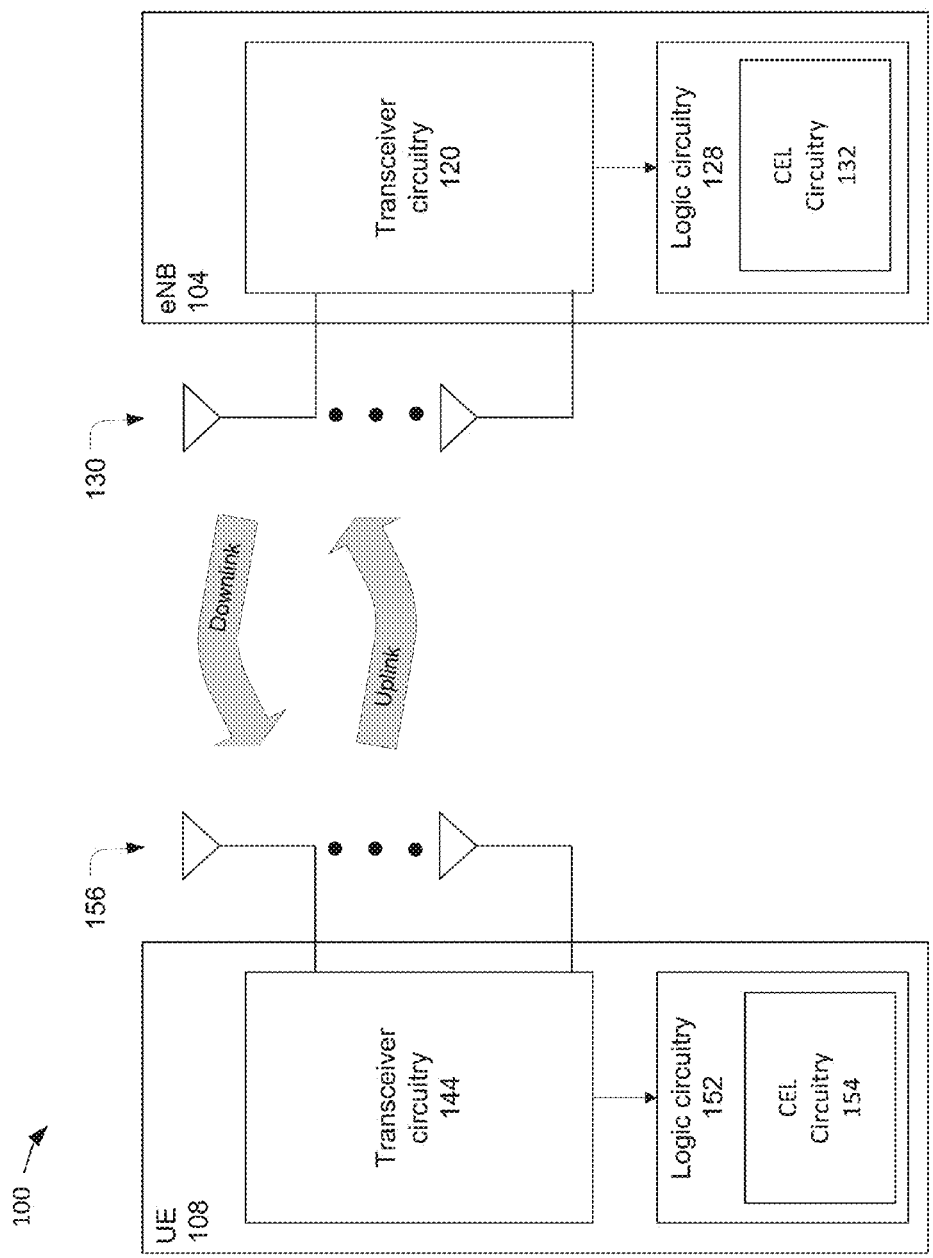
FIG. 1 schematically illustrates a wireless communication environment in accordance with various embodiments of the present disclosure.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As discussed above, to provide sufficient coverage of MTC devices, or MTC user equipments (UEs), special coverage enhancement (CE) considerations may be needed. These coverage enhancements may include a desired coverage enhancement level for various physical channels of communication. For example, in some instances physical uplink channels and physical downlink channels such as, for example, physical downlink control channel (PDCCH), physical uplink shared channel (PUSCH), etc. may be configured to achieve a desired coverage enhancement level, or decibel (dB) gain in signal power.

One method of providing such a coverage enhancement level is through repetition of a signal to reach the desired dB gain in signal power, hereinafter referred to as "signal gain." The number of repetitions to reach a desired signal gain is referred to hereinafter as a "repetition level." The individual repetitions of the repetition level may work to build the signal to the desired signal gain wherein each individual repetition contributes to the resulting overall signal gain.

These repetitions may consume a great number of resources in a wireless network. For example, to achieve a signal gain of 20 dB, a signal may need to be repeated at a repetition level of 100 or more. In wireless networks, however, not all MTC UEs may be configured for the maximum repetition level. For example, an MTC UE operated in a basement may be configured for a higher repetition level than an MTC UE operated by a window. Furthermore, in some instances, an access point of a wireless network (e.g., an evolved node B (eNB)) may not have any MTC UEs that are within operational proximity of the access point. As used herein, operational proximity indicates a proximity from an access point in which a UE, MTC UE or otherwise, may utilize the access point for access to a wireless network. In other instances, a wireless access point may only have MTC UEs within an operational proximity that are configured for a coverage enhancement level that is less than a maximum supported coverage enhancement level. As a result, operating the access point at the maximum supported coverage enhancement level in these instances may unnecessarily waste resources of the access point. However, operating the access point at a coverage enhancement level that is less than the maximum supported coverage enhancement level may prevent MTC devices that are configured for the maximum supported coverage enhancement level, or merely for a coverage enhancement level that is higher than the current coverage enhancement level, from being able to establish communication with the access point should such an MTC UE move to within operational proximity of the access point. As a result, in embodiments of the present disclosure, an access point may be designed to operate at a first coverage enhancement level for MTC UEs that have previously established communication with the access point. In such embodiments, the access point may be designed to periodically switch to a maximum supported coverage enhancement level, or another selected coverage enhancement level, to enable discovery of any MTC UEs that may be configured for a higher coverage enhancement level than the first coverage enhancement level. As used herein a higher coverage enhancement level may refer to a larger desired signal gain, for example a coverage enhancement level associated with a 20 dB signal gain would be higher than a coverage enhancement level associated with a 5 dB signal gain.

FIG. 1 schematically illustrates a wireless communication environment 100 in accordance with various embodiments. The environment 100 may include a UE 108 in wireless communication with an access node such as evolved node B (eNB) 104. The eNB 104 may be part of a 3rd Generation Partnership Project (3GPP) long-term evolution (LTE) network (or an LTE-Advanced (LTE-A) network). In particular, the eNB 104 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

The eNB 104 may include transceiver circuitry 120 with which to receive uplink transmissions from UE 108 via one or more antennas 130 and transmit downlink transmissions to UE 108 via the one or more antennas 130. eNB 104 may also include logic circuitry 128 coupled with transceiver circuitry 120. In embodiments logic circuitry 128 may be configured to decode and encode information transmitted in signals communicated between UE 108 and eNB 104. Logic circuitry 128 may further be configured by coverage enhancement level (CEL) circuitry 132 to cause eNB 104 to perform any portion of the coverage enhancement level processes described herein, such as that described in reference to FIG. 2.

UE 108 may include transceiver circuitry 144, logic circuitry 152, and one or more antennas 156. Transceiver circuitry 144 may be coupled with the one or more antennas 156 to receive downlink transmission from eNB 104 and transmit uplink transmissions to eNB 104. Logic circuitry 152 may be coupled to transceiver circuitry 144, and may be configured to decode and encode information transmitted in signals communicated between the UE 108 and the eNB 104. Logic circuitry 152 may further be configured by CEL circuitry 154 to cause UE 108 to perform any portion of the coverage enhancement level processes described herein, such as those described in reference to FIG. 2.

Figure 2:
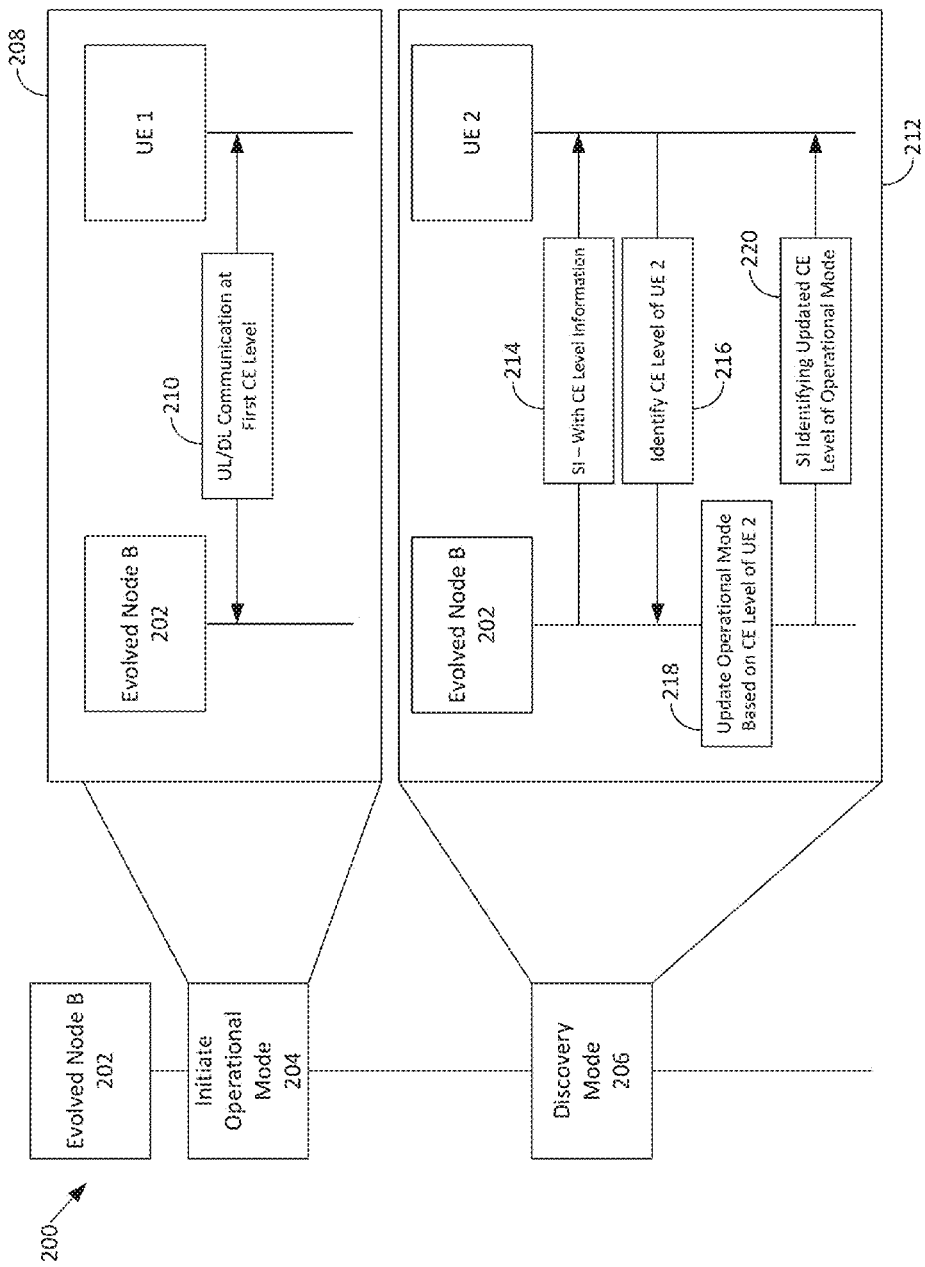
FIG. 2 is a flowchart illustrating a operation of an evolved node b at multiple coverage enhancement levels.

FIG. 2 is a flowchart illustrating a process flow 200 of an evolved node B (eNB) 202, such as eNB 104 of FIG. 1, operating in an enhanced coverage mode (ECM) at multiple coverage enhancement levels, in accordance with various embodiments of the present disclosure. In embodiments, process flow 200 may begin at block 204, wherein eNB 202 may initiate an operational mode. An embodiment of such an operational mode is depicted in box 208.

At block 210, such an operational mode may provide uplink/downlink (UL/DL) communication, via, for example, transceiver circuitry 120 of FIG. 1, at a first repetition level associated with the first coverage enhancement level. In embodiments, the first coverage enhancement level may correspond with a highest coverage enhancement level associated with UEs that have previously established communication with the eNB, such as UE 1. In some embodiments, eNB 202 may have yet to establish communication with any UEs configured for a level of coverage enhancement. UEs configured for a level of coverage enhancement are also referred to herein as coverage constrained UEs. In these embodiments, the first coverage enhancement level may correspond with a minimum coverage enhancement level that eNB 202 has been preconfigured to provide. For instance, in some embodiments, eNB 202 may be preconfigured to provide for a coverage enhancement level associated with a signal gain of 0, which may correspond with a repetition level of 1, until a higher coverage enhancement level is negotiated, as discussed below. In other instances, eNB 202 may be preconfigured to provide for a coverage enhancement level associated with a signal gain of a fraction of what a maximum supported coverage enhancement level is associated with. Such a fraction may, for example, be selected to encompass the most likely coverage enhancement levels eNB 202 may encounter. For example, if the highest supported coverage enhancement level corresponds with a 20 dB signal gain, but a majority of possible UEs are configured for a signal gain of 10 dB or less, the minimum coverage enhancement level may be preconfigured to 10 dB.

In some embodiments, such an operational mode may also provide UL/DL communication, via, for example, transceiver circuitry 120 of FIG. 1, at one or more additional repetition levels respectively associated with one or more additional coverage enhancement levels. These one or more additional coverage enhancement levels may, in some embodiments, be associated with additional UEs that have established communication with eNB 202. In such embodiments, eNB 202 may be configured to periodically switch between the first coverage enhancement level and the one or more additional coverage enhancement levels while eNB 202 is in the operational mode. In such embodiments, the switching from the first coverage enhancement level to one of the one or more additional coverage enhancement levels may occur in response to the occurrence of an event, such as a predetermined time or after a predetermined duration. In such embodiments, the additional UEs may be preconfigured to communicate with eNB 202 while eNB 202 is operated at or above a selected minimum coverage enhancement level.

In some embodiments, eNB 202 may be configured to provide system information messages, via, for example, a broadcast message included in physical downlink shared channel (PDSCH) transmissions, which may include an identification of the current coverage enhancement level that the eNB is operating in. Such system information messages may be included, for example, in an existing system information block (SIB) or in a newly defined SIB for this purpose. In some embodiments, such a system information message may also include a duration, associated with the current coverage enhancement level, during which eNB 202 is to maintain operation in the current coverage enhancement level. While system information messages are discussed above, it will be appreciated that other broadcast messages transmissions on PDSCH may also carry such information, including, but not limited to, paging messages or random access response messages.

In embodiments, eNB 202 may periodically switch from the operational mode and may initiate a discovery mode at block 206. In embodiments, while operating in the discovery mode, eNB 202 may be designed to operate at a maximum anticipated coverage enhancement level. Such a maximum anticipated coverage enhancement level may be selected, for instance, based on an anticipated worst case coverage enhancement level. For example, in some embodiments, the maximum coverage enhancement level anticipated may be a coverage enhancement level associated with a 20 dB signal gain. In such embodiments, eNB 202 may be configured, for example, by coverage enhancement level (CEL) circuitry 132 of FIG. 1, to provide uplink/downlink (UL/DL) communication, via, for example, transceiver circuitry 120 of FIG. 1, at a repetition level associated with the maximum anticipated coverage enhancement level.

In embodiments, the switching from the operational mode to discovery mode may be initiated in response to the occurrence of an event, such as a predetermined time or after a predetermined duration. In some embodiments, coverage constrained UEs may be configured to determine when such an event is to occur. Such a determination may be made, for example, by CEL circuitry 154 of FIG. 1. For instance, eNB 202 may be designed to initiate the discovery mode based upon predefined time interval and may operate in the discovery mode for a predefine duration. For example, eNB 202 may initiate the discovery mode at the beginning of every hour and may operate the discovery mode for a five minute duration. In such an example, a coverage constrained UE may be configured to determine that for the first five minutes of every hour the coverage constrained UE can communicate with eNB 202 regardless of the coverage enhancement level the coverage constrained UE is configured for. It will be appreciated that this interval and duration are merely meant to be illustrative and that any such time interval and duration may be utilized without departing from the scope of this disclosure. An illustrative discovery mode process flow is depicted in box 208.

In such embodiments, eNB 202, while operated in the discovery mode, may be configured to send, at block 214, system information messages. These system information messages may be sent, for example, via physical downlink shared channel (PDSCH) transmissions. In embodiments, these system information messages may include CE level information. This CE level information may include an identifier of the current coverage enhancement level or levels (e.g., first CE level) that may be supported by eNB 202 during the operational mode. In addition, a time interval and/or duration for each of these supported CE levels may also be included in such CE level information. In some embodiments, such CE level information may be formatted, for example, as tuples, wherein a first portion of the tuple identifies a coverage enhancement level and the second portion of the tuple contains a duration, or time interval, associated with the identified coverage enhancement level. Such system information messages may be included, for example, in an existing system information block (SIB) or in a newly defined SIB for this purpose and may be transmitted, via, for example, transceiver circuitry 120 of FIG. 1, at the maximum anticipated coverage enhancement level.

All coverage constrained UEs, or at least those coverage constrained UEs that have yet to establish communication with eNB 202, e.g., UE 2, may be preconfigured to monitor downlink transmissions from eNB 202 for CE level information while eNB 202 is operated in the discovery mode. As mentioned above, in such embodiments, the coverage constrained UEs may be preconfigured, for instance, with a predetermined time interval and duration, during which the coverage constrained UEs may be able to receive downlink transmissions regardless of the coverage enhancement level the coverage constrained UEs are configured for. Such predetermined time intervals may be hardcoded in the coverage constrained UEs. In some embodiments, a coverage constrained UE that may be in a lower powered state, such as a sleep or dormant mode, may wake up for the discovery mode discussed above.

In some embodiments, a coverage constrained UE that is associated with a coverage enhancement level already supported by eNB 202 during the operational mode may utilize the CE level information to determine time periods during which the coverage constrained UE may be able to establish communication with eNB 202. In other embodiments, the coverage enhancement levels supported by eNB 202 during the operational mode may not be sufficient to enable a coverage constrained UE to establish communication with eNB 202 during the operational mode. In such embodiments, the coverage constrained UE, UE 2, may negotiate support for a higher coverage enhancement level with eNB 202. This negotiation may begin at at block 216 where an identifier of a coverage enhancement level UE 2 is configured for may be transmitted to eNB 202. Such a transmission may be sent, for example in an uplink (UL) information element (IE). Such an IE may be called, for example, ECM-CE-Level-info and may be transmitted from UE 2 to eNB 202 by way of an existing UL RRC message or in a new UL RRC message as illustrated in FIGS. 3, 4 and 5, discussed below.

At block 218, eNB 202 may update the operational mode based on the CE level identified in block 216. In some embodiments, eNB 202 may be configured to provide a single coverage enhancement level during the operational mode. In such embodiments, eNB 202 may update the operational mode by merely increasing the coverage enhancement level for the operational mode, and may maintain such a coverage enhancement level for the duration of the operational mode. In other embodiments, eNB 202 may be configured to provide a selection of coverage enhancement levels. In such embodiments, eNB 202 may update the operational mode to include an additional coverage enhancement level based upon the coverage enhancement level identified by UE 2 in block 216.

At block 220, eNB 202 may send another system information message identifying the updated coverage enhancement level. Such a system information message may be sent, for example, via PDSCH transmission. In some embodiments, this system information message may include the CE level information discussed above, however, the CE level information may be amended to include the additional coverage enhancement level. Such a system information message may be included, for example, in a system information block (SIB) and may be transmitted, via, for example, transceiver circuitry 120 of FIG. 1, at the maximum anticipated coverage enhancement level. It will be appreciated that the duration of the discovery mode may be selected based upon an amount of time the above described discovery mode process flow would need to be completed at the maximum anticipated coverage enhancement level for both UL and DL communications. It will also be appreciated that the above described operational mode and discovery mode may be carried out on each frequency band available from eNB 202. For example, the above described operational and discovery modes may be carried out on each LTE frequency band in an LTE environment.

FIG. 3 illustrates an example uplink (UL) information element (IE) 300 that may be sent by a coverage constrained UE to indicate a coverage enhancement level the coverage constrained UE is configured for during the discovery mode described above. As depicted, the IE may be labeled, for example, ECM-CE-Level-Info 302 and may contain a variable ecm-ce-level that may include an identifier of the coverage enhancement level the coverage constrained UE is configured for. In some embodiments, such an IE may be incorporated in the existing UEAssistanceInformation radio resource control (RRC) message, as depicted in FIG. 4. In other embodiments a new uplink-dedicated control channel radio resource control (UL-DCCH RRC) message may be defined for this purpose as illustrated in FIG. 5.

FIG. 4 illustrates an example UEAssistanceInformation RRC message 400 having ECM-CE-Level-Info IE 402, such as that discussed above in reference to FIG. 3, incorporated therein. This UEAssistanceInformationMessage 400 may be sent by a coverage constrained UE to indicate a desired coverage enhancement level during the discovery mode described above.

FIG. 5 illustrates an example showing a new UL-DCCH RRC message that may carry the proposed ECM-CE-Level-Info IE, such as that discussed above in reference to FIG. 3. As can be seen, ecmCeLevelIndication-rxx 502 has been incorporated into the messageClassExtension. The ECM-CeLevelIndication-rxx is then depicted in box 504 that incorporares an ecm-Ce-Level-Info IE, such as that discussed above in reference to FIG. 3.

Figure 6:
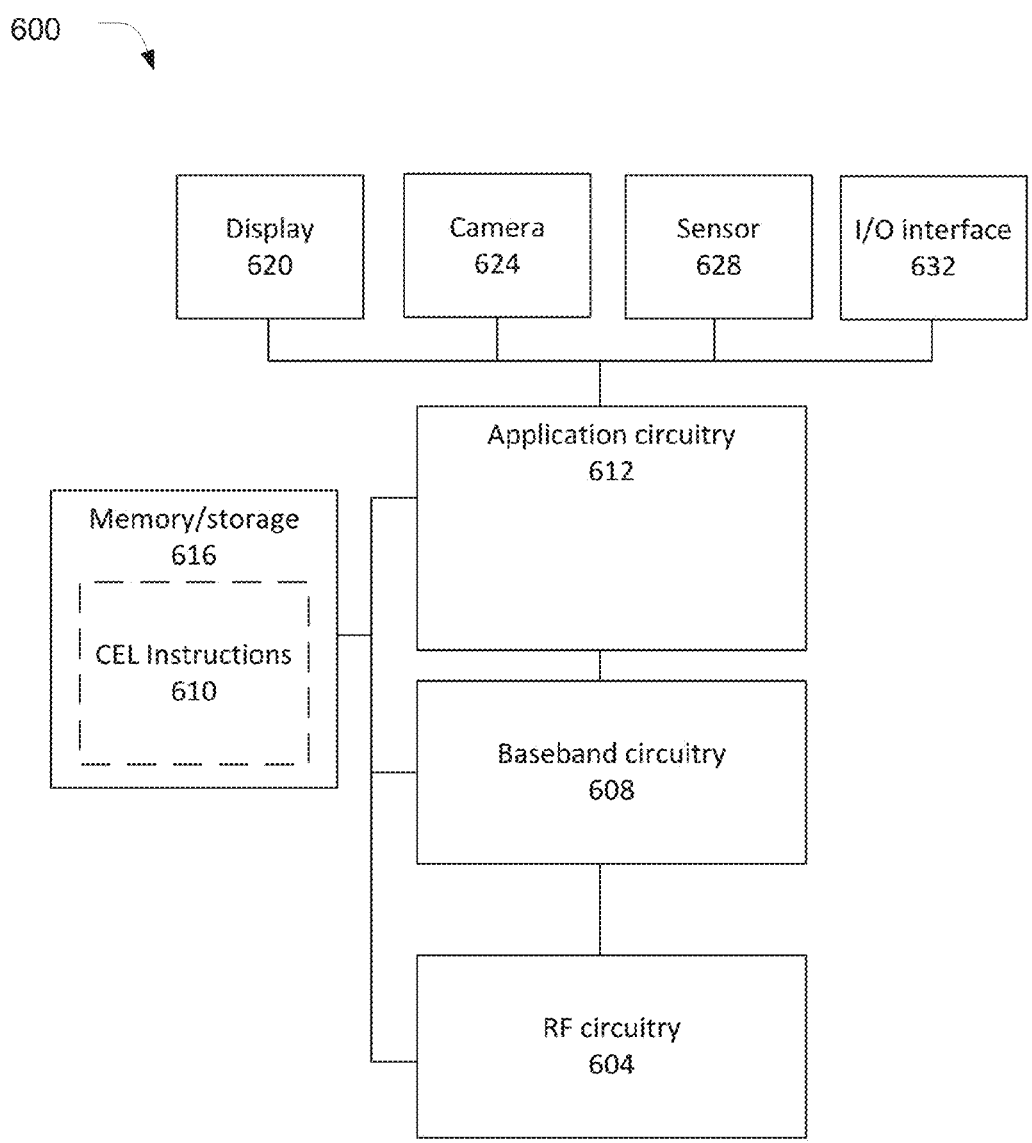
FIG. 6 is a block diagram of an example computing device that may be used to practice various embodiments described herein.

FIG. 6 illustrates, for one embodiment, an example system 600 comprising radio frequency (RF) circuitry 604, baseband circuitry 608, application circuitry 612, memory/storage 616, display 620, camera 624, sensor 628, and input/output (I/O) interface 632, coupled with each other at least as shown.

The application circuitry 612 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 616 and configured to execute instructions stored in the memory/storage 616 to enable various applications and/or operating systems running on the system 600.

The baseband circuitry 608 may include circuitry such as, but not limited to, one or more single-core or multi-core processors. The processor(s) may include a baseband processor. The baseband circuitry 608 may handle various radio control functions that enable communication with one or more radio networks via the RF circuitry 604. The radio control functions may include, but are not limited to, signal modulation, encoding, decoding, radio frequency shifting, etc. In some embodiments, the baseband circuitry 608 may provide for communication compatible with one or more radio technologies. For example, in some embodiments, the baseband circuitry 608 may support communication with an E-UTRAN and/or other wireless metropolitan area networks (WMAN), a wireless local area network (WLAN), or a wireless personal area network (WPAN). Embodiments in which the baseband circuitry 608 is configured to support radio communications of more than one wireless protocol may be referred to as multi-mode baseband circuitry.

In various embodiments, baseband circuitry 608 may include circuitry to operate with signals that are not strictly considered as being in a baseband frequency. For example, in some embodiments, baseband circuitry 608 may include circuitry to operate with signals having an intermediate frequency, which is between a baseband frequency and a radio frequency.

In some embodiments, the transceiver circuitry 112 and/or the logic circuitry 152 may be embodied in the application circuitry 612 and/or the baseband circuitry 608.

RF circuitry 604 may enable communication with wireless networks using modulated electromagnetic radiation through a non-solid medium. In various embodiments, the RF circuitry 604 may include switches, filters, amplifiers, etc., to facilitate the communication with the wireless network.

In various embodiments, RF circuitry 604 may include circuitry to operate with signals that are not strictly considered as being in a radio frequency. For example, in some embodiments, RF circuitry 604 may include circuitry to operate with signals having an intermediate frequency, which is between a baseband frequency and a radio frequency.

In some embodiments, the wireless transceiver 144 may be embodied in the RF circuitry 604.

In some embodiments, some or all of the constituent components of the baseband circuitry 608, the application circuitry 612, and/or the memory/storage 616 may be implemented together on a system on a chip (SOC).

Memory/storage 616 may be used to load and store data and/or instructions, for example CEL instructions 610 which may be configured to cause system 600 to carry out any portion of the coverage enhancement process discussed herein. Memory/storage 616 for one embodiment may include any combination of suitable volatile memory (e.g., dynamic random access memory (DRAM)) and/or non-volatile memory (e.g., Flash memory).

In various embodiments, the I/O interface 632 may include one or more user interfaces designed to enable user interaction with the system 600 and/or peripheral component interfaces designed to enable peripheral component interaction with the system 600. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 628 may include one or more sensing devices to determine environmental conditions and/or location information related to the system 600. In some embodiments, the sensors may include, but are not limited to, a gyro sensor, an accelerometer, a proximity sensor, an ambient light sensor, and a positioning unit. The positioning unit may also be part of, or interact with, the baseband circuitry 608 and/or RF circuitry 604 to communicate with components of a positioning network, e.g., a global positioning system (GPS) satellite.

In various embodiments, the display 620 may include a display (e.g., a liquid crystal display, a touch screen display, etc.).

In various embodiments, the system 600 may be a mobile computing device such as, but not limited to, a laptop computing device, a tablet computing device, a netbook, an ultrabook, a smartphone, etc. In various embodiments, system 600 may have more or fewer components, and/or different architectures.

EXAMPLES

The following paragraphs describe examples of various embodiments.

Example 1 may include an evolved node B (eNB) comprising: logic circuitry to: cause the eNB to operate in an operational mode to provide a first coverage enhancement level for user equipments (UEs) that have established communication with the eNB or a preconfigured minimum coverage enhancement level; and cause the eNB to periodically switch from the operational mode to a discovery mode, wherein the discovery mode is to provide a second coverage enhancement level for UEs that are to establish communication with the eNB; and transceiver circuitry to: send downlink transmissions at a first repetition level associated with the first coverage enhancement level while the eNB is in the operational mode and a second repetition level associated with the second coverage enhancement level while the eNB is in the discovery mode.

Example 2 may include the subject matter of Example 1, wherein the operational mode is further to: provide one or more additional coverage enhancement levels associated with additional UEs that have established communication with the eNB, wherein the logic circuitry is further to cause the eNB to periodically switch between the first coverage enhancement level and the one or more additional coverage enhancement levels while the eNB is in the operational mode, wherein the transceiver circuitry is further to: send downlink transmissions at one or more additional repetition levels respectively associated with the one or more additional coverage enhancement levels while the eNB is in the operational mode.

Example 3 may include the subject matter of either of Examples 1 or 2, wherein the transceiver circuitry is further to receive an uplink transmission from at least one UE that identifies a coverage enhancement level associated with the at least one UE, wherein the identified coverage enhancement level is associated with a higher repetition level than the first coverage enhancement level, and wherein the logic circuitry is further to update the operational mode based upon the identified coverage enhancement level.

Example 4 may include the subject matter of any one of Examples 1-3, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

Example 5 may include the subject matter of any one of Examples 1-4, wherein the downlink transmissions include an identifier of one or more of the first coverage enhancement level or a duration associated with the first coverage enhancement level during which the eNB is to be operated in the operational mode.

Example 6 may include the subject matter of any one of Examples 1-5, wherein the second repetition level is selected to achieve a maximum coverage enhancement level of up to 20 decibels (dB).

Example 7 may include the subject matter of any one of Examples 1-6, wherein to cause the eNB to periodically switch from the operational mode to the discovery mode is based upon at least one of a preconfigured time interval or a preconfigured time duration.

Example 8 may include a method of operating an evolved node B comprising: initiating, by the evolved node B (eNB), an operational mode to provide a first coverage enhancement level for user equipments (UEs) that have established communication with the eNB or a preconfigured minimum coverage enhancement level; and switching, by the eNB, in response to detection of an event, from the operational mode to a discovery mode, wherein the discovery mode provides a second coverage enhancement level for UEs that are to establish communication with the eNB; and sending, by the eNB, downlink transmissions at a first repetition level associated with the first coverage enhancement level while the eNB is in the operational mode and a second repetition level associated with the second coverage enhancement level while the eNB is in the discovery mode.

Example 9 may include the subject matter of Example 8, wherein the operational mode further provides one or more additional coverage enhancement levels associated with additional UEs that have established communication with the eNB, and the method further comprising: switching, by the eNB, based on one or more additional events, between the first coverage enhancement level and the one or more additional coverage enhancement levels while the eNB is in the operational mode; and sending, by the eNB, downlink transmissions at one or more additional repetition levels respectively associated with the one or more additional coverage enhancement levels while the eNB is in the operational mode.

Example 10 may include the subject matter of either of Examples 8 or 9, further comprising: receiving, by the eNB, an uplink transmission from at least one UE that identifies a coverage enhancement level associated with the at least one UE, wherein the identified coverage enhancement level is associated with a higher repetition level than the first coverage enhancement level; and updating the operational mode based upon the identified coverage enhancement level.

Example 11 may include the subject matter of any one of Examples 8-10, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

Example 12 may include the subject matter of any one of Examples 8-11, wherein the downlink transmissions include an identifier of one or more of the first coverage enhancement level or a duration associated with the first coverage enhancement level during which the eNB is to be operated in the operational mode.

Example 13 may include the subject matter of any one of Examples 8-12, wherein the second repetition level is selected to achieve a maximum coverage enhancement level of up to 20 decibels (dB).

Example 14 may include the subject matter of any one of Examples 8-13, wherein the event is based upon at least one of a preconfigured time interval or a preconfigured time duration.

Example 15 may include one or more computer-readable non-transitory media, having instructions stored thereon, the instructions, in response to execution by an evolved node B (eNB), to cause the eNB to: initiate an operational mode to provide a first coverage enhancement level for user equipments (UEs) that have established communication with the eNB or a preconfigured minimum coverage enhancement level; and switch from the operational mode to a discovery mode, in response to detection of an event, wherein the discovery mode provides a second coverage enhancement level for UEs that are to establish communication with the eNB; and send downlink transmissions at a first repetition level associated with the first coverage enhancement level while the eNB is in the operational mode and a second repetition level associated with the second coverage enhancement level while the eNB is in the discovery mode.

Example 16 may include the subject matter of Example 15, wherein the operational mode further provides one or more additional coverage enhancement levels associated with additional UEs that have established communication with the eNB, and the instructions, when executed by the eNB, further cause the eNB to: switch between the first coverage enhancement level and the one or more additional coverage enhancement levels while the eNB is in the operational mode; and send downlink transmissions at one or more additional repetition levels respectively associated with the one or more additional coverage enhancement levels while the eNB is in the operational mode.

Example 17 may include the subject matter of either of Examples 15 or 16, wherein the instructions, when executed by the eNB, further cause the eNB to: receive an uplink transmission from at least one UE that identifies a coverage enhancement level associated with the at least one UE, wherein the identified coverage enhancement level is associated with a higher repetition level than the first coverage enhancement level; and update the operational mode based upon the identified coverage enhancement level.

Example 18 may include the subject matter of any one of Examples 15-17, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

Example 19 may include the subject matter of any one of Examples 15-18, wherein the downlink transmissions include one or more of an identifier of the first coverage enhancement level or a duration during which the eNB is to be operated in the operational mode.

Example 20 may include the subject matter of any one of Examples 15-19, wherein the second repetition level is selected to achieve a maximum coverage enhancement level of up to 20 decibels (dB).

Example 21 may include the subject matter of any one of Examples 15-20, wherein the event is based upon at least one of a preconfigured time interval or a preconfigured time duration.

Example 22 may include a user equipment (UE) comprising: transceiver circuitry to: receive downlink transmissions from an evolved node B (eNB) during a discovery time period in which the eNB is to be operated in a discovery mode, wherein the downlink transmissions identify a first coverage enhancement level associated with a first repetition level, and wherein the downlink transmissions are received at a second repetition level associated with a second coverage enhancement level; logic circuitry coupled with the transceiver circuitry to: determine whether the first coverage enhancement level is sufficient for the UE to establish communication with the eNB.

Example 23 may include the UE of Example 22, wherein the logic circuitry is further to cause, in response to a determination that the first coverage enhancement level is insufficient for the UE to establish communication with the eNB, cause the transceiver circuitry to send an uplink transmission indicating a third coverage enhancement level associated with the UE to enable the UE to establish communication with the eNB.

Example 24 may include the UE of either of Examples 22 or 23, wherein the logic circuitry is further to determine a time at which the discovery time period is to begin.

Example 25 may include the subject matter of any one of Examples 22-24, wherein the second repetition level is to achieve a maximum coverage enhancement level of up to 20 decibels (dB).

Example 26 may include an evolved node B (eNB) comprising: means for initiating an operational mode to provide a first coverage enhancement level for user equipments (UEs) that have established communication with the eNB or a preconfigured minimum coverage enhancement level; and means for switching, in response to detection of an event, from the operational mode to a discovery mode, wherein the discovery mode provides a second coverage enhancement level for UEs that are to establish communication with the eNB; and means for sending downlink transmissions at a first repetition level associated with the first coverage enhancement level while the eNB is in the operational mode and a second repetition level associated with the second coverage enhancement level while the eNB is in the discovery mode.

Example 27 may include the subject matter of Examples 26, wherein the operational mode further provides one or more additional coverage enhancement levels associated with additional UEs that have established communication with the eNB, and the eNB further comprising: means for switching, based on one or more additional events, between the first coverage enhancement level and the one or more additional coverage enhancement levels while the eNB is in the operational mode; and means for sending downlink transmissions at one or more additional repetition levels respectively associated with the one or more additional coverage enhancement levels while the eNB is in the operational mode.

Example 28 may include the subject matter of either of Examples 26 or 27, further comprising: means for receiving an uplink transmission from at least one UE that identifies a coverage enhancement level associated with the at least one UE, wherein the identified coverage enhancement level is associated with a higher repetition level than the first coverage enhancement level; and means for updating the operational mode based upon the identified coverage enhancement level.

Example 29 may include the subject matter of any one of Examples 26-28, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

Example 30 may include the subject matter of any one of Examples 26-29, wherein the downlink transmissions include an identifier of one or more of the first coverage enhancement level or a duration associated with the first coverage enhancement level during which the eNB is to be operated in the operational mode.

Example 31 may include the subject matter of any one of Examples 26-30, wherein the second repetition level is selected to achieve a maximum coverage enhancement level of up to 20 decibels (dB).

Example 32 may include the subject matter of any one of Examples 26-31, wherein the event is based upon at least one of a preconfigured time interval or a preconfigured time duration.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An evolved node B (eNB) comprising:
   logic circuitry to:
      cause the eNB to operate in an operational mode to provide a first coverage enhancement level for user equipments (UEs) that have established communication with the eNB or a preconfigured minimum coverage enhancement level; and
      cause the eNB to periodically switch from the operational mode to a discovery mode, wherein the discovery mode is to provide a second coverage enhancement level for UEs that are to establish communication with the eNB; and
   transceiver circuitry to: send downlink transmissions at a first repetition level associated with the first coverage enhancement level while the eNB is in the operational mode and a second repetition level associated with the second coverage enhancement level while the eNB is in the discovery mode.

2. The eNB of claim 1, wherein the operational mode is further to: provide one or more additional coverage enhancement levels associated with additional UEs that have established communication with the eNB, wherein the logic circuitry is further to cause the eNB to periodically switch between the first coverage enhancement level and the one or more additional coverage enhancement levels while the eNB is in the operational mode, wherein the transceiver circuitry is further to: send downlink transmissions at one or more additional repetition levels respectively associated with the one or more additional coverage enhancement levels while the eNB is in the operational mode.

3. The eNB of claim 1,
   wherein the transceiver circuitry is further to receive an uplink transmission from at least one UE that identifies a coverage enhancement level associated with the at least one UE, wherein the identified coverage enhancement level is associated with a higher repetition level than the first coverage enhancement level, and
   wherein the logic circuitry is further to update the operational mode based upon the identified coverage enhancement level.

4. The eNB of claim 1, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

5. The eNB of claim 1, wherein the downlink transmissions include an identifier of one or more of the first coverage enhancement level or a duration associated with the first coverage enhancement level during which the eNB is to be operated in the operational mode.

6. The eNB of claim 1, wherein the second repetition level is selected to achieve a maximum coverage enhancement level of up to 20 decibels (dB).

7. The eNB of claim 1, wherein to cause the eNB to periodically switch from the operational mode to the discovery mode is based upon at least one of a preconfigured time interval or a preconfigured time duration.

8. A method of operating an evolved node B comprising:
   initiating, by the evolved node B (eNB), an operational mode to provide a first coverage enhancement level for user equipments (UEs) that have established communication with the eNB or a preconfigured minimum coverage enhancement level; and
   switching, by the eNB, in response to detection of an event, from the operational mode to a discovery mode, wherein the discovery mode provides a second coverage enhancement level for UEs that are to establish communication with the eNB; and
   sending, by the eNB, downlink transmissions at a first repetition level associated with the first coverage enhancement level while the eNB is in the operational mode and a second repetition level associated with the second coverage enhancement level while the eNB is in the discovery mode.

9. The method of claim 8, wherein the operational mode further provides one or more additional coverage enhancement levels associated with additional UEs that have established communication with the eNB, and the method further comprising:
   switching, by the eNB, based on one or more additional events, between the first coverage enhancement level and the one or more additional coverage enhancement levels while the eNB is in the operational mode; and
   sending, by the eNB, downlink transmissions at one or more additional repetition levels respectively associated with the one or more additional coverage enhancement levels while the eNB is in the operational mode.

10. The method of claim 8, further comprising:
    receiving, by the eNB, an uplink transmission from at least one UE that identifies a coverage enhancement level associated with the at least one UE, wherein the identified coverage enhancement level is associated with a higher repetition level than the first coverage enhancement level; and
    updating the operational mode based upon the identified coverage enhancement level.

11. The method of claim 8, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

12. The method of claim 8, wherein the downlink transmissions include an identifier of one or more of the first coverage enhancement level or a duration associated with the first coverage enhancement level during which the eNB is to be operated in the operational mode.

13. The method of claim 8, wherein the second repetition level is selected to achieve a maximum coverage enhancement level of up to 20 decibels (dB).

14. The method of claim 8, wherein the event is based upon at least one of a preconfigured time interval or a preconfigured time duration.

15. One or more computer-readable non-transitory media, having instructions stored thereon, the instructions, in response to execution by an evolved node B (eNB), to cause the eNB to:
   initiate an operational mode to provide a first coverage enhancement level for user equipments (UEs) that have established communication with the eNB or a preconfigured minimum coverage enhancement level; and
   switch from the operational mode to a discovery mode, in response to detection of an event, wherein the discovery mode provides a second coverage enhancement level for UEs that are to establish communication with the eNB; and
   send downlink transmissions at a first repetition level associated with the first coverage enhancement level while the eNB is in the operational mode and a second repetition level associated with the second coverage enhancement level while the eNB is in the discovery mode.

16. The computer-readable media of claim 15, wherein the operational mode further provides one or more additional coverage enhancement levels associated with additional UEs that have established communication with the eNB, and the instructions, when executed by the eNB, further cause the eNB to:
   switch between the first coverage enhancement level and the one or more additional coverage enhancement levels while the eNB is in the operational mode; and
   send downlink transmissions at one or more additional repetition levels respectively associated with the one or more additional coverage enhancement levels while the eNB is in the operational mode.

17. The computer-readable media of claim 15, wherein the instructions, when executed by the eNB, further cause the eNB to:
   receive an uplink transmission from at least one UE that identifies a coverage enhancement level associated with the at least one UE, wherein the identified coverage enhancement level is associated with a higher repetition level than the first coverage enhancement level; and
   update the operational mode based upon the identified coverage enhancement level.

18. The computer-readable media of claim 15, wherein the downlink transmissions include physical downlink control channel (PDCCH) transmissions, or broadcast messages sent via physical downlink shared channel (PDSCH) transmission, wherein the broadcast messages include system information messages, paging messages or random access response messages.

19. The computer-readable media of claim 15, wherein the downlink transmissions include one or more of an identifier of the first coverage enhancement level or a duration during which the eNB is to be operated in the operational mode.

20. The computer-readable media of claim 15, wherein the second repetition level is selected to achieve a maximum coverage enhancement level of up to 20 decibels (dB).

21. The computer-readable media of claim 15, wherein the event is based upon at least one of a preconfigured time interval or a preconfigured time duration.

22. A user equipment (UE) comprising:
   transceiver circuitry to: receive downlink transmissions from an evolved node B (eNB) during a discovery time period in which the eNB is to be operated in a discovery mode, wherein the downlink transmissions identify a first coverage enhancement level associated with a first repetition level, and wherein the downlink transmissions are received at a second repetition level associated with a second coverage enhancement level;
   logic circuitry coupled with the transceiver circuitry to: determine whether the first coverage enhancement level is sufficient for the UE to establish communication with the eNB.

23. The UE claim 22, wherein the logic circuitry is further to cause, in response to a determination that the first coverage enhancement level is insufficient for the UE to establish communication with the eNB, cause the transceiver circuitry to send an uplink transmission indicating a third coverage enhancement level associated with the UE to enable the UE to establish communication with the eNB.

24. The UE of claim 22, wherein the logic circuitry is further to determine a time at which the discovery time period is to begin.

25. The UE of claim 22, wherein the second repetition level is to achieve a maximum coverage enhancement level of up to 20 decibels (dB).

* * * * *